(12) United States Patent
Chow et al.

(10) Patent No.: US 8,849,437 B2
(45) Date of Patent: Sep. 30, 2014

(54) ADAPTIVE MACHINING FOR IMPROVING ASSEMBLY FIT OF CONSUMER ELECTRONICS

(71) Applicant: Apple Inc., Cupertino, CA (US)

(72) Inventors: Norman Chow, Milpitas, CA (US);
Brian K. Copeland, San Jose, CA (US);
Erik D. Gillow, Santa Clara, CA (US);
Daniel A. Green, Campbell, CA (US);
David Kim, Shenzhen (CN); William S. Masek, North Attleboro, MA (US);
Donald Q. Ross, III, San Jose, CA (US);
Chuan You Su, Shenzhen (CN); Mark E. Wilcox, San Jose, CA (US)

( * ) Notice: Subject to any disclaimer, the term of this patent is extended or adjusted under 35 U.S.C. 154(b) by 6 days.

(21) Appl. No.: 13/626,853

(22) Filed: Sep. 25, 2012

(65) Prior Publication Data
US 2014/0083731 A1    Mar. 27, 2014

(51) Int. Cl.
*G06F 19/00*    (2011.01)

(52) U.S. Cl.
USPC ............................................. 700/95; 700/182

(58) Field of Classification Search
USPC ........ 700/95, 97, 103, 173, 182; 174/50, 138;
425/503, 504; 428/37; 361/728.81,
361/679.21, 379.3
See application file for complete search history.

(56) References Cited

U.S. PATENT DOCUMENTS

| | | | |
|---|---|---|---|
| 6,280,349 B1 | 8/2001 | Cook | |
| 6,449,529 B1 | 9/2002 | Oleksy | |
| 7,987,696 B2 * | 8/2011 | Kuronita et al. | 73/35.02 |
| 2009/0040703 A1 * | 2/2009 | Gotham et al. | 361/681 |
| 2009/0238443 A1 | 9/2009 | Sato et al. | |
| 2009/0258101 A1 | 10/2009 | Linares | |
| 2010/0270052 A1 * | 10/2010 | Crohas et al. | 174/50 |
| 2011/0084579 A1 * | 4/2011 | Chang | 312/223.1 |

FOREIGN PATENT DOCUMENTS

WO    WO2011156340    12/2011

* cited by examiner

*Primary Examiner* — Kidest Bahta
(74) *Attorney, Agent, or Firm* — Womble Carlyle Sandridge & Rice LLP

(57) ABSTRACT

Methods and structures for manufacturing and assembling matching parts in a manufacturing line are described. In some embodiments, the parts are portions of a consumer product, such as an electronic device. The matching parts are manufactured and assembled in a way such that the interface between the matching parts is substantially seamless. In some embodiments, the interface has a feature with curved portions. Methods involve measuring the dimensions of a primary part and custom machining a secondary part to seamlessly fit with the primary part. In this way, the secondary part is made to uniquely fit the primary part. The primary and secondary parts can be marked to identify them as matching parts in a manufacturing environment where numerous pairs of parts are made.

18 Claims, 5 Drawing Sheets

ADAPTIVE MACHINING FOR IMPROVING ASSEMBLY FIT OF CONSUMER ELECTRONICS

FIELD OF THE DESCRIBED EMBODIMENTS

The described embodiments relate generally to machining and assembling of parts. More specifically, embodiments describe methods for manufacturing and assembling matching parts together in a way that make them appear completely flush with each other once assembled. Tools and methods for analyzing the dimensions of parts during the manufacturing process are described.

BACKGROUND

Consumer products such as electronic devices are typically made from multiple pieces that are assembled together during a manufacturing process. The pieces can be made of different materials such as metal, plastic, glass, etc. For instance, an electronic device can have a metal housing with a glass window or screen as well as plastic components fitted into certain regions of the metal housing. For aesthetic reasons, usually it is desirable for the pieces to be joined together in a flush manner such that the resultant product has no visible or tactile gaps between them.

Since consumer products are generally manufactured in mass, it can be difficult to produce individual pieces that fit together in a seamless manner. In particular, machining of parts involves tolerances, which inevitably introduces errors in the dimensions of the pieces. If two machined pieces are fit together, the resultant gap will include the sum of the manufacturing error from the nominal design of the two components. Additionally, other factors such as part handling, stress relief during subsequent processing and environmental conditions can change the shape of the parts prior to assembly. The result is individual pieces that have different dimensions that do not fit seamlessly together.

SUMMARY

This paper describes various embodiments that relate to methods and tools for manufacturing matching parts of a consumer product. Methods described are can be used for machining and assembling matching parts in the manufacture of electronic devices such as mobile phones, computer tablets and the like. The matching parts are machined and assembled in a way such that the interface between the matching parts has substantially no gap. In some embodiments, methods include receiving a primary part having a first feature with at least one curved region; measuring the first feature to determine a first feature profile having a number of measurement points using a scanning device; receiving a secondary part, the secondary part having a second feature with at least one curved region, where the second feature is in conformance with and oversized in relation to the first feature; machining the secondary part using the first feature profile until a second feature profile matches the first feature profile; and providing a seamless interface between the primary and secondary parts by assembling the primary and secondary parts together by coupling the first and second features.

Methods described are well suited for manufacturing multiple pieces in a manufacturing setting by marking individual parts to identify corresponding mates. In some embodiments, methods include measuring a first feature of a primary part to determine a first feature profile comprising a plurality of measurement points using a scanning device, wherein data corresponding to the first feature profile is stored as a first feature profile data; marking the primary part with a first mark, the first mark corresponding to the first feature profile data; transferring the first feature profile data to a CNC machine; machining a secondary part using the CNC machine based on the first feature profile data until a second feature profile matches the first feature profile; marking the secondary part with a second mark, the second mark corresponding to the primary part; and providing a seamless interface between the primary and secondary parts by assembling the primary and secondary parts together by coupling the first and second features.

Methods described can be used to manufacture parts of electronic devices. For example, some electronic devices have radio frequency (RF) windows that allow radio transmissions to be transmitted to and from the electronic device. In one disclosed embodiment, an electronic device includes a metallic housing which has an opening having a profile with at least one curved region; and a plastic RF window, where the plastic RF window is capable of transmitting radio waves therethrough, and where the plastic RF window is positioned in the opening of the metallic housing such that components within the metallic housing can transmit and receive radio waves through the RF window, and where the interface between the plastic RF housing and the opening at the at least one curved region has substantially no gap.

Embodiments disclosed for use in a manufacturing environment typically involve the use of computer numerical control (CNC) machine which can store and process computer readable code. In some described embodiments, a non-transitory computer readable medium for storing computer program code executed by a processor for machining a part is used. The computer readable medium can include computer program code for accepting a first feature profile data corresponding to a first feature profile of a primary part, the first feature profile data comprising a number of measurement points along the profile of the primary part; and transmitting a second feature profile data matching the first feature profile data to a CNC tool such that the CNC tool can machine a secondary part until the secondary part has a second feature profile matching the first feature profile, where the first feature profile of the primary part can be coupled with the second feature profile of the secondary part in a substantially seamless manner.

BRIEF DESCRIPTION OF THE DRAWINGS

The embodiments will be readily understood by the following detailed description in conjunction with the accompanying drawings with like reference numerals designating like structural elements, and in which.

DETAILED DESCRIPTION OF SELECTED EMBODIMENTS

Figure 1:
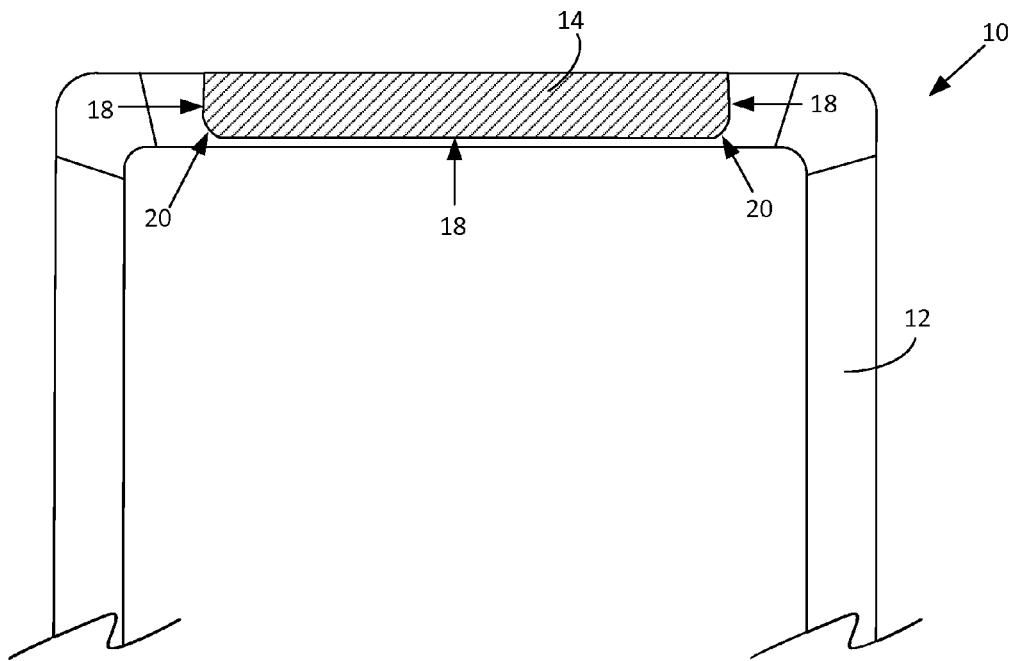
FIG. 1 illustrates a back view of an electronic device having an RF window assembled in a housing in accordance with described embodiments.

The following disclosure describes various embodiments of electronic devices, such as portable electronic devices including, for example, mobile telephones. Certain details are set forth in the following description and Figures to provide a thorough understanding of various embodiments of the present technology. Moreover, various features, structures, and/or characteristics of the present technology can be combined in other suitable structures and environments. In other instances, well-known structures, materials, operations, and/or systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods and components.

Representative applications of methods and apparatuses according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting, such that other embodiments may be used, and changes may be made without departing from the spirit and scope of the described embodiments.

The following describes methods and tools used for manufacturing matching parts that are to be assembled together in a final product. The matching parts fit together in a seamless manner with substantially no visible or tactile gaps between them. In conventional mass production assemblies, individual parts are typically manufactured using tight tolerances in an attempt to control the deviation from nominal dimensions. However, when the individual parts are assembled together, there can be gaps at the interface of the parts. The magnitude of the gaps will include the sum of the manufacturing error from the nominal design of the two components, in addition to any design gap for assembly of the corresponding parts. Additionally, other factors such as part handling, stress relief during subsequent processing of the parts and environmental conditions can change the shapes of the parts prior to assembly. Some materials can be more susceptible to distortion. For instance, plastic materials because of their malleable characteristics tend to distort more easily than metal or glass.

One known method for reducing the gaps between adjacent parts is the use of a selective assembly or binning process. This technique is commonly used in situations where clearances are critical, for example, in the manufacture of engine bearing to crank journal clearances in internal combustion engines. In selective assembly or binning processes, a population of parts is manufactured and sorted into bins of parts based on size. For example, one bin can be dedicated to containing relatively small parts and another bin can be dedicated to containing relatively large parts. During assembly, large parts can be matched with corresponding large parts and small parts can be matched with corresponding small parts. Through use of a binning process, an improved fit can be achieved over non-sorting of the part population. However, binning techniques can be less effective if the parts have dimensions that are not straight edges such as curved surfaces. In particular, matching spline curved surfaces can be difficult to match together in a seamless manner. This is because in spine curves the directional path varies along the curve. That is, the path of the spline curve does not follow a simple constant radius such as circle. Thus, use of binning techniques on matching parts that have curved surfaces can result in an assembled product having gaps, especially at the interface between the curved surfaces. In addition, in a manufacturing setting where many parts are produced, use of binning techniques can result in a number of parts that do not have adequately matching parts and thus end up being discarded.

Methods and tools described herein use adaptive machining techniques to achieve a substantially seamless interface between matching parts, including regions of the parts that have curved surfaces. The techniques can be well suited in the manufacture of portions of consumer products such as electronic devices. For instance, electronic devices can have radio transparent portions or radio frequency (RF) windows that fit into corresponding cut-outs in the metal housing of the devices. The RF windows are typically made of conformable material such as plastic. Since metal housing substantially blocks the transmission of radio waves, the RF window provides a region of the device where radio frequency waves can be transmitted to and from the device. RF windows can be used in any suitable electronic device that utilizes radio transmission, such as in the iPad and iPhone manufactured by Apple Inc. of Cupertino, Calif. It should be noted that although methods and tools described herein are demonstrated with respect to RF windows assembled in electronic device housings, the methods and tools can be used in the manufacture of any suitable product involving the assembly of matching pieces.

Figure 2:
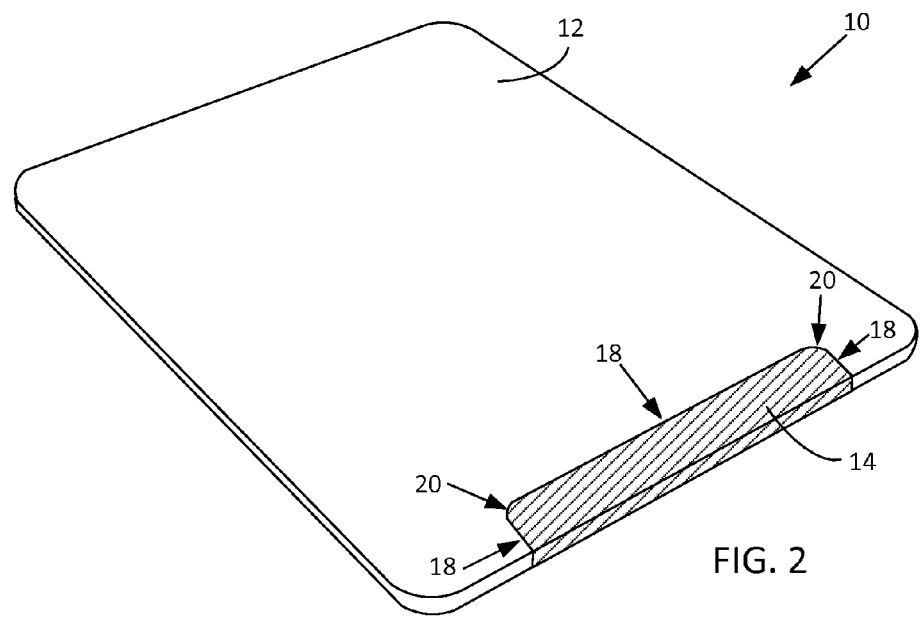
FIG. 2 illustrates an isometric view of an electronic device having an RF window assembled in a housing in accordance with described embodiments.

To illustrate an electronic device having an RF window, FIGS. 1 and 2 show back and isometric views, respectively, of tablet computer 10 having an RF window 14 fitted in housing 12. Housing 10 can be made of a metal material such as aluminum or aluminum alloy and which can block radio frequency waves from being transmitted to and from tablet computer 10. RF windows 14 can be made of a radio wave transmissive plastic material to allow underlying components to transmit and/or receive radio wave transmissions used in, for example, WiFi and/or GPS functions of the device. As shown in FIGS. 1 and 2, RF windows 14 have straight edges 18 and curved edges 20. The interface between aluminum housing 12 and RF window 14 has a substantially seamless and gap-free appearance, even at curved edges 20. This is achieved using adaptive machining processes in accordance with described embodiments.

Figure 3:
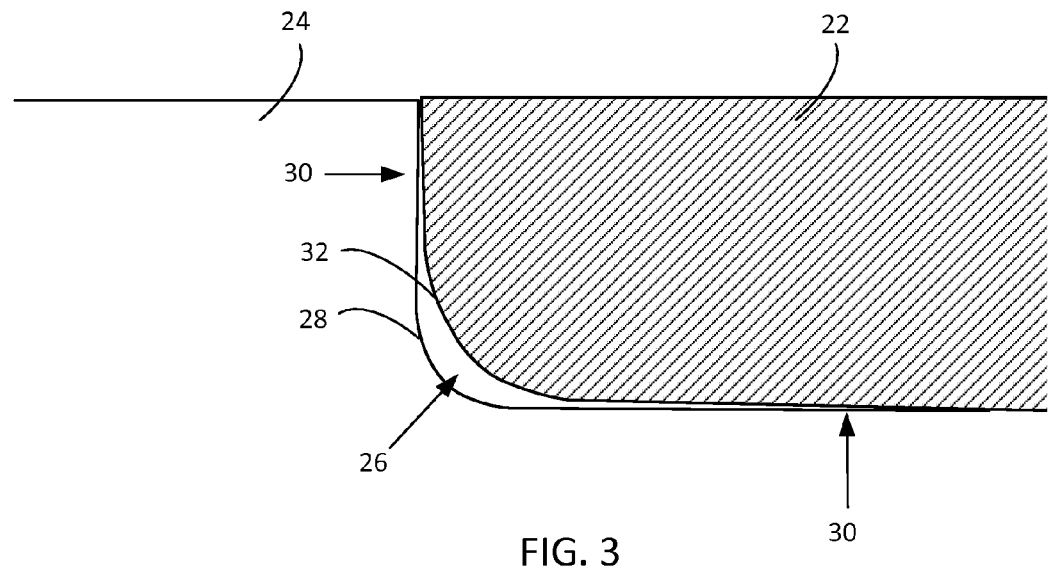
FIG. 3 illustrates a close up view of an RF window assembled in a housing with a gap in a curved portion of the housing.
Figure 4:
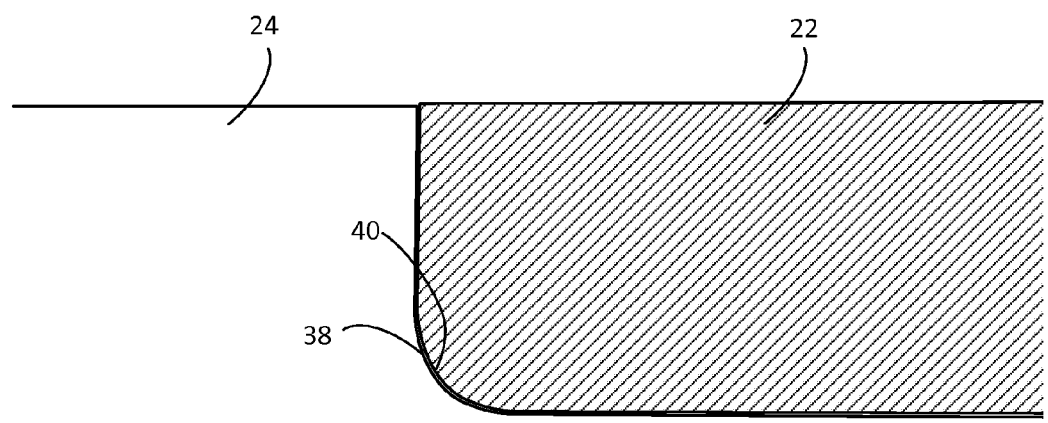
FIG. 4 illustrates a close up view of an RF window assembled in a housing having substantially no gap in a curved portion of the housing in accordance with described embodiments.

FIG. 3 illustrates a close up view of an RF window 22 assembled in a cut-out portion of housing 24 using standard manufacturing techniques. As shown, gap 26 resides at the interface between RF window 22 and housing 24, and is especially pronounced at the curved regions of housing 24. This is due to curvature profile 28 of housing 24 being different than curvature profile 32 of RF window 22. As described above, standard techniques involve machining each of RF window 22 and housing 24 using tight tolerances. However, even with tight tolerances, the tolerance of RF window 22 and housing 24 are added together when the pieces are assembled together resulting in gap 26. If binning techniques are used, it can be possible to improve the fit at straight edge portions 30 but binning techniques generally will not compensate for tolerances along curved edges of RF window 22 and housing 24. FIG. 4 illustrates a close up view of an RF window 34 assembled in a cut-out portion of housing 36 using adaptive machining techniques described herein. As shown, substantially no gap exists between RF window 34 and housing 36, even at the curved region of housing 36. This is because curvature profile 38 of housing 36 is substantially the same as curvature profile 40 of RF window 34.

The adaptive machining methods described herein involve characterizing the profile of a first part and machining a second part based on the profile of the second part such that the second part is a substantially an exact match for the first part. In a mass production setting, each secondary part is custom crafted to match an already existing primary part on a per part basis. In this manner, the variation from nominal of the primary part (i.e., tolerance) is compensated for by the custom fabrication of the secondary part to exactly mate with the primary part. The resulting fit between the two parts is thus improved beyond using only tight tolerancing and binning techniques.

Figure 5:
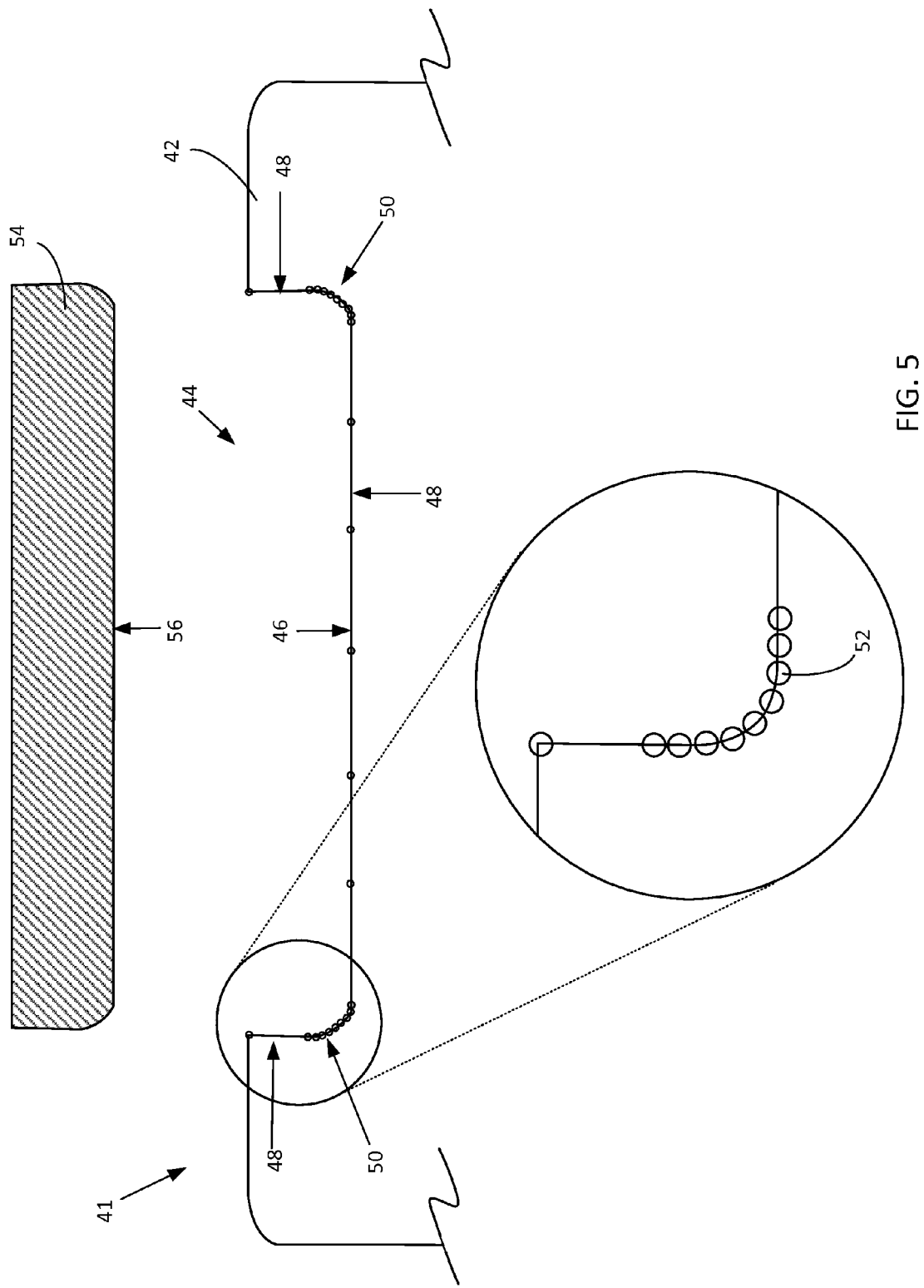
FIG. 5 illustrates a portion of a housing during a scanning process in accordance with described embodiments.

Characterizing the profile of the primary part can involve the use of any suitable technique or combination of techniques for measuring the dimensions of a surface of a part, including optical or vision systems, laser systems, charge-coupled device (CCD) inspection system and physical probes (e.g. post probing) techniques. For instance, the edge of the primary part can be scanned using an optical system to collect data with regard to the profile shape with reference to a datum. In some embodiments the scanning procedure is automated using a computerized measurement machine. In order to get an accurate measurement, the part is typically secured in a fixture of the measurement machine before measurement begins. FIG. 5 shows a portion of an electronic device 41 undergoing a scanning operation in accordance with described embodiments. Housing 42 has opening 44 having a profile 46 having straight portions 48 and curved portions 50. During the scanning process, an optical system collects a number of measurement points at various locations along profile 46. In FIG. 5, each measurement point is represented with a circle 52. As shown in the inset view, curved portions 50 generally have more measurement points (represented by circles) to sufficiently characterize the shape of the profile in these portions compared to straight portions 48. This is because curved portions 50 have geometries that do not have a simple fixed radius such as a circle. That is, the directional path varies along the curved portions 50. In general, the number of measurement points increases in areas with larger rates of profile change, i.e., having more curves.

It should be noted that although the scanning techniques illustrated in FIG. 5 show scanning in two dimensions, in other embodiments a scan in three dimensions can be made. Two-dimensional characterization can be applied to match profiles between two substantially planar parts such as the RF window 54 and housing opening 44 of FIG. 5. However, methods described herein can also be used to match the profiles of three-dimensional surfaces as well. That is, a three-dimensional surface of a part can be characterized by scanning the surface with an optical, laser or probing system. As in a two dimensional model, certain regions of a three-dimensional surface can be scanned with more measurement points to adequately characterize the three-dimensional shape of certain regions. For example, surface regions having bumps or that have irregular features can have more measurement points. In addition to measuring the profile and surface geometries, other dimensions of the part can be measured such as thicknesses and offset heights.

Returning to FIG. 5, after profile 46 of housing 42 is measured, the measurement data can then be fed into a processor which translates the measurements into a tool path with compensations including but not limited to tool diameter, tool wear, temperature, and tool spring-back. The tool path can then entered in a computer numerical control (CNC) machine, such as a CNC milling machine, which can perform a machining operation on RF window 54. In FIG. 5, a tool path corresponding to housing opening profile 46 is used to create a corresponding RF window profile 56. RF window 54 is machined until a RF window profile matches with housing opening profile 46. In some embodiments, before the machining operation is performed, RF window 54 is pre-cut to have the general shape of and to be oversized in relation to opening 44 such that only a finishing cut is necessary to match fit RF window 54 into opening 44. In certain embodiments, the tool path can also be embedded as a routine in a larger program which creates the entire RF window from raw stock. Upon completion of the machining operation, RF window 54 can be fitted into opening 44 and bonded to housing 42 using an adhesive.

Figure 6:
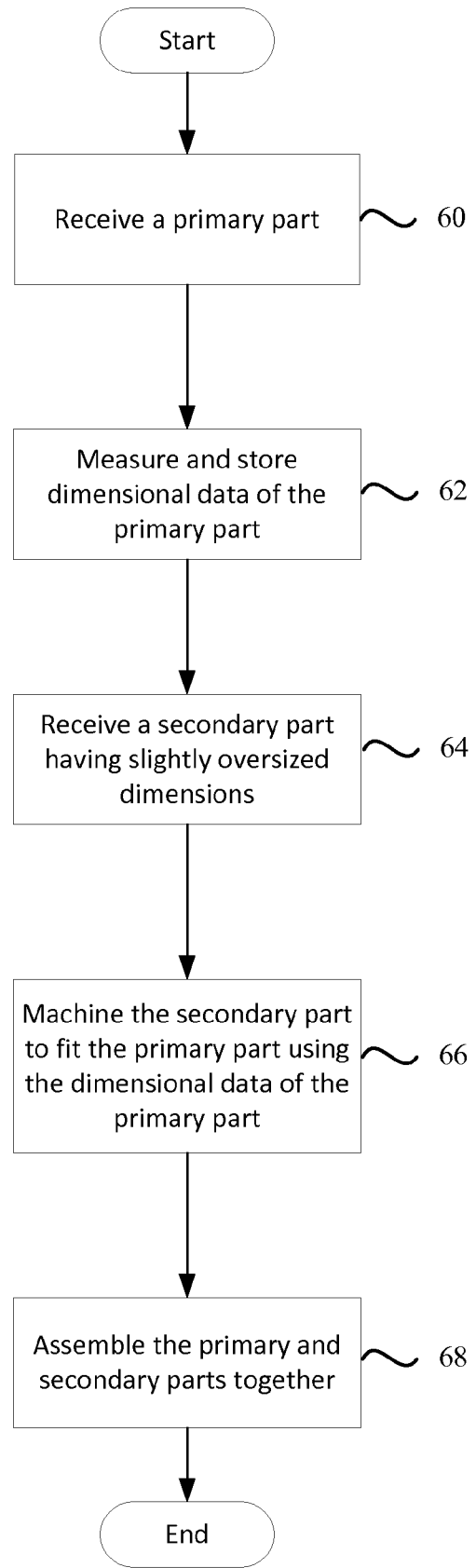
FIG. 6 is a flowchart illustrating process steps for manufacturing matching parts in accordance with described embodiments.

The described adaptive machining methods are well suited for use in a manufacturing setting where numerous matching parts are being formed and where factors such as tool time, manufacturing output and efficiency are important. FIG. 6 is a flowchart showing process steps involved in an adaptive machining process used in a manufacturing setting in accordance with described embodiments. At 60, a primary part having a feature that is suitable for matching with a secondary part is received. For instance, in FIG. 5 the primary part can be housing 42 and the secondary part can be RF window 54. The feature of the primary part can be, for example, a cut-out that was previously machined in the primary part. Since the adaptive machining techniques are useful for matching parts that have curved regions, the primary part will typically have at least one curved region, such as the curved surfaces 50 of FIG. 5. In a manufacturing setting, the primary part can be chosen from a number of pre-fabricated parts. The primary part can be made of any suitable material. In the manufacture of electronic devices, typical materials include metal, such as aluminum or steel or alloys thereof, plastic, glass and silicon rubber. In some embodiments the primary and secondary parts are made of different materials. In other embodiments, the primary and secondary parts are made of the same material. In some cases the primary part has been optionally processes using, for example, an anodizing, etching or painting process. For instance in electronic device 41 of FIG. 5, after opening 44 is machined into metal housing 42, the housing can be anodized to form an anodization layer over the metal surfaces of housing 42 including profile 46. The anodization layer can change the dimensions of profile 46 compared to the original machined dimensions. Since methods described herein involve the custom fabrication of the secondary part to uniquely fit the primary part, dimensional variations caused by processing such as anodizing will be taken into account.

At 62, the dimensions of the primary part are measured using, for example, a scanning process as described above. In a manufacturing environment, the scanning is typically done using an automated and computerized machine where the profile data can be stored in a database. Once the measurement is compete and the profile data stored, at 64 a secondary part is received. As with the primary part, the secondary part can be chosen from a number of prefabricated secondary parts. The secondary part can be prefabricated in conformance with at least a portion of the primary part. Conformance can be defined as similar in shape and dimensions to the primary part but not matching with the primary part. For example, in the electronic device of FIG. 5, the RF window can be prefabricated to have the general shape of housing opening 44. The secondary part is preferably oversized in comparison to the corresponding portion of the primary part such that a finishing cut can be made in the secondary part to fit in the corresponding portion of the primary part. At 66, the secondary part is machined to fit the corresponding portion of the primary part using the stored dimensional data of the primary part. In a manufacturing setting, typically a CNC machine, such as a CNC milling machine, is used to machine the secondary part. Generally a CNC tool uses a computer program (G-code) to execute precision cutting of a workpiece in an automated process. The CNC tool can use a computer algorithm to convert the stored scan data to CNC G-code, which in turn provides instructions to the CNC machine for cutting the workpiece. Any of a number of suitable algorithms can be used to convert the scan data to CNC G-code. Although CNC tools can generally provide precision cutting, factors such as equipment backlash and tool drift will still produce part-to-part variations which can be factored in as tolerance limits.

At 68, the primary and secondary parts are assembled together and optionally bonded using an adhesive or coupled using one or more fastening devices such as bolts. In some embodiments, the location of the measurement of the primary part is at the same location or near the location where the machining of the secondary part takes place. This arrangement can be useful when the primary and secondary parts are made of different materials. Different material have different material coefficients of thermal expansion (CTE) which cause them to expand and contract at different degrees based on environmental conditions such as temperature and humidity. For example, consumer electronics typically employ a mix of plastics, metals, glass, etc., each of which have different CTE. If the primary part is measure at the same location or near the same location that the secondary part is machined, the effects of differing CTE can be reduced. In one embodiment, the measurement station for measuring the primary part is located next to a CNC machining center for machining the secondary part. Further, in some embodiments, the primary part and secondary parts are assembled immediately or shortly after the secondary part is machined. This immediate assembly can be useful in situations where the primary and/or secondary parts are made of materials that can be relatively easily deformed from, for example, handling, settling, environmental conditions or subsequent production operations. If the parts are assembled shortly after they are machined, there is less opportunity for the parts to change in shape or size making them less compatible to seamlessly fitting together.

In some cases it can be desirable to have different parts of a device manufactured in different location, for example at different locations within a facility or at different facilities. This arrangement can be useful when two or more locations have specialize equipment for manufacturing particular parts. For example, referring again to FIG. 5, metal housing 42 can be manufactured at a first location while plastic RF window 54 can be manufactured at a second location. After metal housing 42 is measured in the first location, the profile 46 data can be transfer to the second location and used as a basis for manufacturing RF window 54. For example, a primary part having a feature that is suitable for matching with a secondary part can be measured using, for example, a scanning process as described above. In a manufacturing environment, the scanning is typically done using an automated and computerized machine where the profile data can be stored in a database. In addition, the primary part is marked with, for example, a sticker having an identifier to uniquely identify the part and matched with its corresponding profile data. The identifier can be a number, letter or a computer readable code. The dimensional data of the primary part can then be transferred to a second location. The data transfer can be executed using any of a number of suitable methods such uploading/downloading the data via the internet (e.g. using a secure internet service) or by storing the data on a storage device and transferring the storage device to the second location.

Once the data is received at the second location, the secondary part is machined to fit the primary part using the dimensional data of the primary part. As described above, this can be accomplished by using, for example, a CNC machine which can translate the dimensional data to cutting corresponding features into the secondary part. After machining, the secondary part can be marked to identify it as a matching piece to the corresponding marked primary part. This marking may be useful when a number of secondary parts are machined and the primary part is not immediately available for assembly. The marked primary part can then be transferred to the second location for assembly. Note that in some embodiments the transfer of dimensional data for the primary part can be done prior to the transfer of the primary part itself. In this way, the secondary part can be manufactured while the primary part is being transferred to the second location thereby reducing the delay time for assembling the final product. Next, the primary part and the secondary part are assembled together. As described above, the primary and secondary parts can be marked with corresponding identifiers in order to distinguish them from other primary and secondary parts.

In some cases it can be desirable for the assembly process to take place at a third location separate from the locations that manufacture and/or measure the individual parts. This arrangement can be useful when the third location has a quality control operation where the individual parts are inspected prior to assembly. In addition, the third location can warehouse the disassembled parts for assembly at a later time. For example, the primary part having a feature that is suitable for matching with the secondary part can measured at a first location. As described above, the scanning can be done using an automated and computerized machine where the profile data can be stored in a database. In addition, the primary part can be marked with a first mark to uniquely identify the part to match it with its corresponding profile data. Next, the dimensional data of the primary part can be transferred to a second location by, for example, uploading/downloading the data via the internet or by storing the data on a storage device and transferring the storage device to the second location.

At the second location, a secondary part is machined to fit the primary part using the dimensional data of the primary part. The secondary part can also be marked with a second mark that corresponds with the first mark, thereby identifying the primary and secondary parts as a mated pair. Then, the marked primary and secondary parts are transferred to a third location. In a manufacturing setting where numerous parts are manufactured and assembled, it may be useful for the third location to have a quality control operation to inspect the numerous individual pieces to make sure the pieces adhere to a pre-defined set of quality criteria. For example, the pieces can be inspected to assure that the machined features are within a certain acceptable tolerance. In addition, the pieces can be inspected for marks, scratches, distortions and other defects. Individual parts that do not pass the quality control inspection can be discarded. If one of a matching pair of parts is discarded, the corresponding part can either be discarded or another corresponding matching part can be manufactured. Next, at the third location the primary and secondary parts are assembled together and optionally bonded together using, for example, an adhesive.

Figure 7:
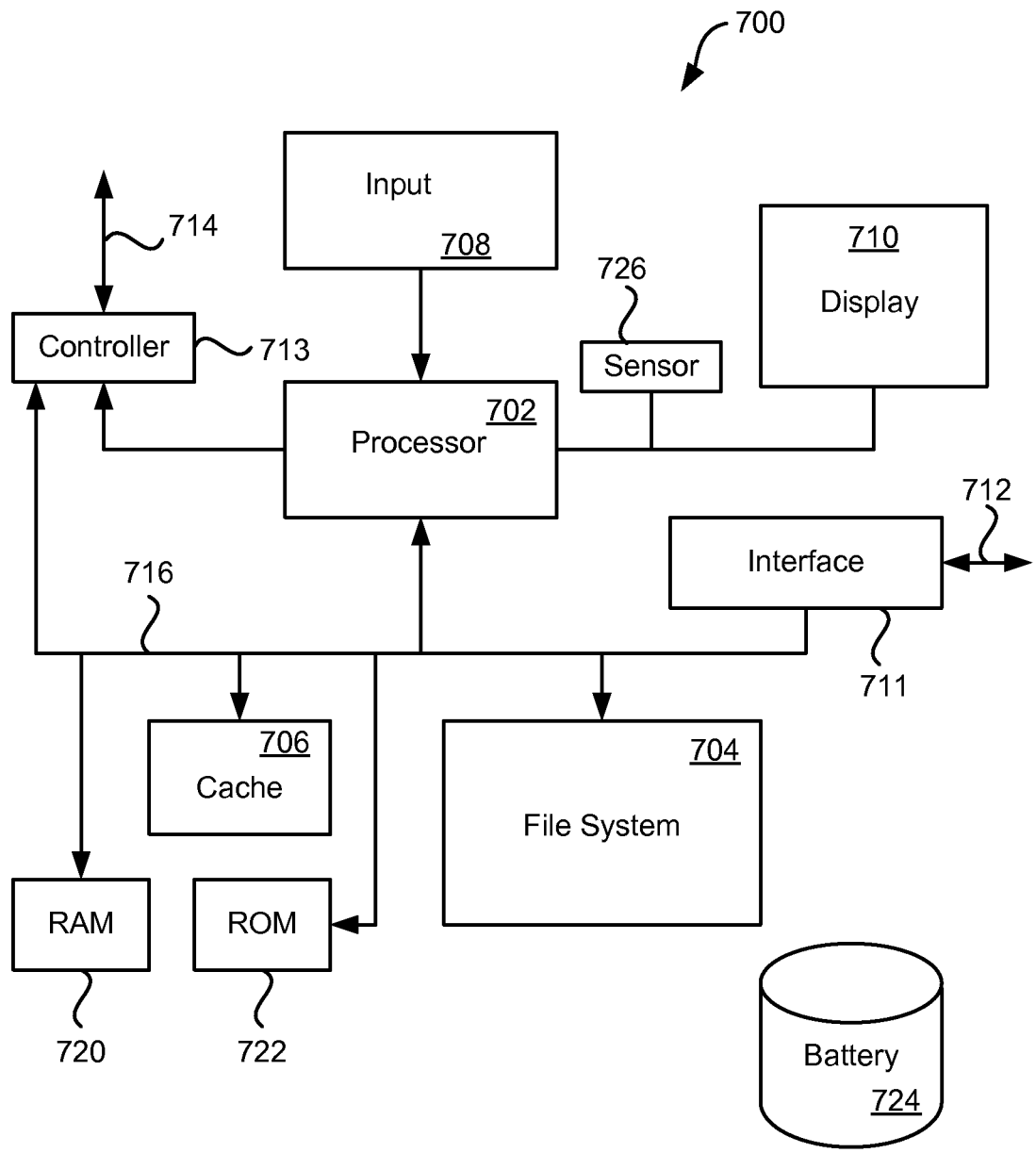
FIG. 7 is a block diagram of an electronic device suitable for controlling some of the processes in the described embodiment

FIG. 7 is a block diagram of an electronic device suitable for controlling some of the processes in the described embodiment. Electronic device 700 can illustrate circuitry of a representative computing device. Electronic device 700 can include a processor 702 that pertains to a microprocessor or controller for controlling the overall operation of electronic device 700. Electronic device 700 can include instruction data pertaining to manufacturing instructions in a file system 704 and a cache 706. File system 704 can be a storage disk or a plurality of disks. In some embodiments, file system 704 can be flash memory, semiconductor (solid state) memory or the like. The file system 704 can typically provide high capacity storage capability for the electronic device 700. However, since the access time to the file system 704 can be relatively slow (especially if file system 704 includes a mechanical disk drive), the electronic device 700 can also include cache 706. The cache 706 can include, for example, Random-Access Memory (RAM) provided by semiconductor memory. The relative access time to the cache 706 can be substantially shorter than for the file system 704. However, cache 706 may not have the large storage capacity of file system 704. Further, file system 704, when active, can consume more power than cache 706. Power consumption often can be a concern when the electronic device 700 is a portable device that is powered by battery 724. The electronic device 700 can also include a RAM 720 and a Read-Only Memory (ROM) 722. The ROM 722 can store programs, utilities or processes to be executed in a non-volatile manner. The RAM 720 can provide volatile data storage, such as for cache 706.

Electronic device 700 can also include user input device 708 that allows a user of the electronic device 700 to interact with the electronic device 700. For example, user input device 708 can take a variety of forms, such as a button, keypad, dial, touch screen, audio input interface, visual/image capture input interface, input in the form of sensor data, etc. Still further, electronic device 700 can include a display 710 (screen display) that can be controlled by processor 702 to display information to the user. Data bus 716 can facilitate data transfer between at least file system 704, cache 706, processor 702, and controller 713. Controller 713 can be used to interface with and control different manufacturing equipment through equipment control bus 714. For example, control bus 714 can be used to control a computer numerical control (CNC) mill, a press, an injection molding machine or other such equipment. For example, processor 702, upon a certain manufacturing event occurring, can supply instructions to control manufacturing equipment through controller 713 and control bus 714. Such instructions can be stored in file system 704, RAM 720, ROM 722 or cache 706.

Electronic device 700 can also include a network/bus interface 711 that couples to data link 712. Data link 712 can allow electronic device 700 to couple to a host computer or to accessory devices. The data link 712 can be provided over a wired connection or a wireless connection. In the case of a wireless connection, network/bus interface 711 can include a wireless transceiver. Sensor 726 can take the form of circuitry for detecting any number of stimuli. For example, sensor 726 can include any number of sensors for monitoring a manufacturing operation such as for example a Hall Effect sensor responsive to external magnetic field, an audio sensor, a light sensor such as a photometer, computer vision sensor to detect clarity, a temperature sensor to monitor a molding process and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium for controlling a manufacturing line. For instance, computer readable dimensional data corresponding to the profile or shape of a part described above can be stored on a non-transitory computer readable medium. In addition, a computer readable code for using the dimensional data on a computerized machine for machining a part can also be stored on a non-transitory computer readable medium. The non-transitory computer readable medium is any data storage device that can store data which can thereafter be read by a computer system. Examples of the non-transitory computer readable medium include read-only memory, random-access memory, CD-ROMs, DVDs, magnetic tape, optical data storage devices and carrier waves. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for custom manufacturing a plurality of consumer products, each consumer product including a primary part and a secondary part, the method comprising:
   custom-fitting a first of the plurality of consumer products, the custom-fitting comprising:
      measuring a first curved region of the primary part using a scanning device to obtain first feature profile data comprising a plurality of measurement points,
      reducing a size of the secondary part such that a second curved region of the secondary part takes on a final shape corresponding to the first curved region based on the first feature profile data, wherein prior to reducing the size of secondary part the second curved region is pre-cut to have an initial shape that approximates the final shape, and
      coupling the primary and secondary parts together such that the first curved region is mated with the final shaped second curved region; and
   repeating the custom-fitting for each of a remainder of the plurality of consumer products.

2. The method of claim 1, wherein measuring the first curved region comprises using more measurement points at a first portion of the first curved region compared to at a second portion of the first curved region.

3. The method of claim 1, further comprising converting the data to G-code for a computer numerical control (CNC) machine, wherein reducing the size of the secondary part includes cutting the secondary part using the CNC machine.

4. The method of claim 1, wherein the measuring the first curved region comprises scanning the first curved region in two dimensions.

5. The method of claim 1, wherein the measuring the first curved region comprises scanning the first curved region in three dimensions.

6. The method of claim 1, wherein the primary part is comprised of metal and prior to measuring the first curved region the primary part is anodized forming an anodization layer over at least the first curved region.

7. The method of claim 1, wherein measuring the first curved region comprises use of one or more of an optical system, vision systems, laser systems, charge-coupled device (CCD) inspection system and physical probe system.

8. The method of claim 1, wherein the primary part is a housing for an electronic device and the secondary part is a RF window.

9. A method for custom manufacturing a plurality of consumer products, each consumer product including a primary part and a secondary part, the method comprising:
custom-fitting a first of the plurality of consumer products, the custom-fitting comprising:
measuring a first a first curved region of the primary part using a scanning device to obtain first feature profile data comprising a plurality of measurement points,
converting the first feature profile data to G-code for a computer numerical control (CNC) machine,
cutting the secondary part using the CNC machine based on the G-code such that a second curved region of the secondary part takes on a final shape corresponding to the first curved region, wherein prior to cutting the secondary part the second curved region is pre-cut to have an initial shape that approximates the final shape, and
coupling the primary and secondary parts together such that the first curved region is mated with the final shaped second curved region; and
repeating the custom-fitting for each of a remainder of the plurality of consumer products.

10. The method of claim 9, further comprising:
marking the primary part with a first mark corresponding to the first feature profile data, and
marking the secondary part with a second mark corresponding to the primary part, wherein marking the primary part and the secondary part matches corresponding primary and secondary parts.

11. The method of claim 9, wherein measuring the first curved region comprises using more measurement points at a first portion of the first curved region compared to at a second portion of the first curved region.

12. The method of claim 9, wherein each of the first curved region and second curved region includes a spline curve.

13. The method of claim 9, wherein the scanning device is an electrical scanning device.

14. The method of claim 9, further comprising:
prior to coupling the primary and secondary parts together, inspecting the primary and secondary parts for quality.

15. A non-transitory computer readable medium for storing computer program code executed by a processor for machining a part, the computer readable medium comprising computer program code for custom manufacturing a plurality of consumer products, each consumer product including a primary part and a secondary part, the non-transitory computer readable medium comprising:
computer code for custom-fitting a first of the plurality of consumer products, the computer code comprising:
computer code for obtaining first feature profile data corresponding to a first curved region of the primary part, the first feature profile data comprising a plurality of measurement points measured using a scanning device along the first curved region of the primary part,
computer code for converting the first feature profile data to G-code for a computer numerical control (CNC) machine, and
computer code for cutting the secondary part using the CNC machine based on the G-code such that a second curved region of the secondary part takes on a final shape corresponding to the first curved region, wherein prior to cutting the secondary part the second curved region is pre-cut to have an initial shape that approximates the final shape, and
computer code for repeating the custom-fitting for each of a remainder of the plurality of consumer products.

16. The non-transitory computer readable medium claim 15, further comprising:
computer code for coupling the primary and secondary parts together such that the first curved region is mated with the final shaped second curved region.

17. The non-transitory computer readable medium claim 15, wherein the primary part is a housing for an electronic device and the secondary part is a RF window.

18. The non-transitory computer readable medium claim 15, wherein a first portion of the first curved region corresponds to more measurement points than a second portion of the first curved region.

* * * * *

UNITED STATES PATENT AND TRADEMARK OFFICE
CERTIFICATE OF CORRECTION

| | | |
|---|---|---|
| PATENT NO. | : 8,849,437 B2 | Page 1 of 1 |
| APPLICATION NO. | : 13/626853 | |
| DATED | : September 30, 2014 | |
| INVENTOR(S) | : Norman Chow et al. | |

It is certified that error appears in the above-identified patent and that said Letters Patent is hereby corrected as shown below:

In the Claims:

Column 10, line 58 (Claim 1, line 13): "secondary part" should read --the secondary part--.

Signed and Sealed this
Thirtieth Day of December, 2014

Michelle K. Lee
*Deputy Director of the United States Patent and Trademark Office*